(12) United States Patent
Baumgartl

(10) Patent No.: US 12,451,498 B2
(45) Date of Patent: Oct. 21, 2025

(54) SEPARATOR

(71) Applicant: SVM Schultz Verwaltungs-GmbH & Co. KG, Memmingen (DE)

(72) Inventor: Peter Baumgartl, Erkheim (DE)

(*) Notice: Subject to any disclaimer, the term of this patent is extended or adjusted under 35 U.S.C. 154(b) by 834 days.

(21) Appl. No.: 17/652,055

(22) Filed: Feb. 22, 2022

(65) Prior Publication Data
US 2022/0271305 A1    Aug. 25, 2022

(30) Foreign Application Priority Data
Feb. 23, 2021   (DE) ................ 102021104298.4

(51) Int. Cl.
| | |
|---|---|
| *H01M 8/04119* | (2016.01) |
| *H01M 8/0252* | (2016.01) |
| *H01M 8/0267* | (2016.01) |
| *H01M 8/04223* | (2016.01) |

(52) U.S. Cl.
CPC ....... *H01M 8/0267* (2013.01); *H01M 8/0252* (2013.01)

(58) Field of Classification Search
CPC  B01D 45/00; B01D 45/08; B01D 2258/0208; H01M 8/0267; H01M 8/0252; H01M 8/04253; H01M 8/04164; H01M 8/04291; H01M 8/0662
USPC ............. 55/392, 392.1, 394, 421, 428.1
See application file for complete search history.

(56) References Cited

U.S. PATENT DOCUMENTS 8,685,587 B2 *  4/2014  Ohira ............... H01M 8/04253
                                                     429/456

FOREIGN PATENT DOCUMENTS

| JP | 2009110714 A | * | 5/2009 |
|---|---|---|---|
| JP | 4689305 B2 | * | 5/2011 |

OTHER PUBLICATIONS

Machine-generated English translation of JP 2009-110714 A, published May 21, 2009.*
Machine-generated English translation of JP 4-689305 B2, published May 25, 2025.*

* cited by examiner

*Primary Examiner* — Frank M Lawrence, Jr.
(74) *Attorney, Agent, or Firm* — Scheef & Stone, L.L.P.; Keith C. Rawlins, Esq.

(57) ABSTRACT

A separator, subassembly for a separator, and method for heating a second outlet of a separator are disclosed. The separator has a housing with an inlet configured for introduction of a fluid stream into the housing, a first outlet configured for discharge of the fluid stream from the housing, and a second outlet configured for discharge from the housing of deposits which have been separated from the fluid stream. The separator also has, within the housing, a heat-conducting element within the housing and arranged in such a way that, an end of the heat-conducting element is arranged in or adjacent to the fluid stream and another end is arranged on the second outlet. The separator can also have a gas line in or on the housing that is connected fluidically to the second outlet so as to guide a heated gas to the second outlet.

20 Claims, 7 Drawing Sheets

SEPARATOR

CROSS-REFERENCE TO RELATED APPLICATIONS

This application claims priority to German Patent Application No. 10 2021 104 298.4 filed Feb. 23, 2021, which is incorporated by reference herein in its entirety.

FIELD OF THE DISCLOSURE

The present disclosure generally relates to a separator.

BACKGROUND

Separators, and in particular water separators, which comprise a housing are known from practice. The separators may, for example, be coupled to a fuel cell and/or be used in a fuel cell vehicle. The housing has an inlet via which a fluid stream can be introduced into the housing. The fluid stream, after the separation in the housing, is discharged from the housing via an outlet in the housing. Moreover, there is provided a further outlet for discharging from the housing deposits which have been separated from the fluid stream. Deposits may for example be water and/or a gas, for example nitrogen.

Water, however, which accumulates in the housing after deactivation of operation, is a problem. The water is formed in that, after deactivation, further water vapor condenses in the housing and accumulates in the region of the further outlet or liquid outlet. At ambient temperatures below freezing point, the water freezes and closes off the further outlet or can even freeze a corresponding valve. This consequently results in it not being possible, upon a restart, for deposits and water to be discharged until the ice has thawed or the valve has defrosted. In particular, the rising water, which cannot yet be discharged owing to the icing, leads to the housing becoming full and to the possibility of it even overflowing. The water can be flushed or sucked into the recirculation circuit. In order to prevent this and to monitor a critical value, a fill-level sensor arrangement is conventionally required.

Use has hitherto been made of active heating elements, normally resistance heating elements, to thaw the ice. However, this approach uses considerable additional energy, leads to a relatively large amount of components and reduces the efficiency of the fuel cell, since a portion of the generated electrical energy has hitherto been used for the heating and thawing.

SUMMARY

A separator comprising a housing having an inlet configured for introduction of a fluid stream into the housing, a first outlet configured for discharge of the fluid stream from the housing, and a second outlet configured for discharge from the housing of deposits which have been separated from the fluid stream; a heat-conducting element in the housing, wherein an end of the heat-conducting element is arranged in or adjacent to the fluid stream, wherein another end of the heat-conducting element is arranged on the second outlet; and a gas line in or on the housing, wherein the gas line is connected fluidically to the second outlet and configured to guide a heated gas to the second outlet.

A subassembly for a separator, the subassembly comprising: a heat-conducting element configured to be placed within a housing of the separator, wherein an end of the heat-conducting element is arranged in or adjacent to a fluid stream in the housing, wherein another end of the heat-conducting element is arranged on an outlet of the housing that is configured for discharge of deposits which have been separated from the fluid stream in the separator; and a liquid outlet valve, wherein the outlet comprises the liquid outlet valve.

A method for heating a second outlet of a separator, wherein the separator has a housing having an inlet configured for introduction of a fluid stream into the housing, a first outlet configured for discharge of the fluid stream from the housing, and a second outlet configured for discharge from the housing of deposits which have been separated from the fluid stream, the method comprising: transporting, by a heat-conducting element, heat from a region of the inlet, of the first outlet, or of both the inlet and the first outlet to the second outlet; guiding, via a gas line which is connected fluidically to the second outlet, heated gas to the second outlet; or both steps of transporting and guiding.

Other technical features may be readily apparent to one skilled in the art from the figures, description, and claims.

BRIEF DESCRIPTION OF THE DRAWINGS

Further features, details and advantages of the disclosure emerge from the wording of the claims and from the following description of exemplary embodiments on the basis of the drawings. In the drawings:

DETAILED DESCRIPTION

Figure 1:
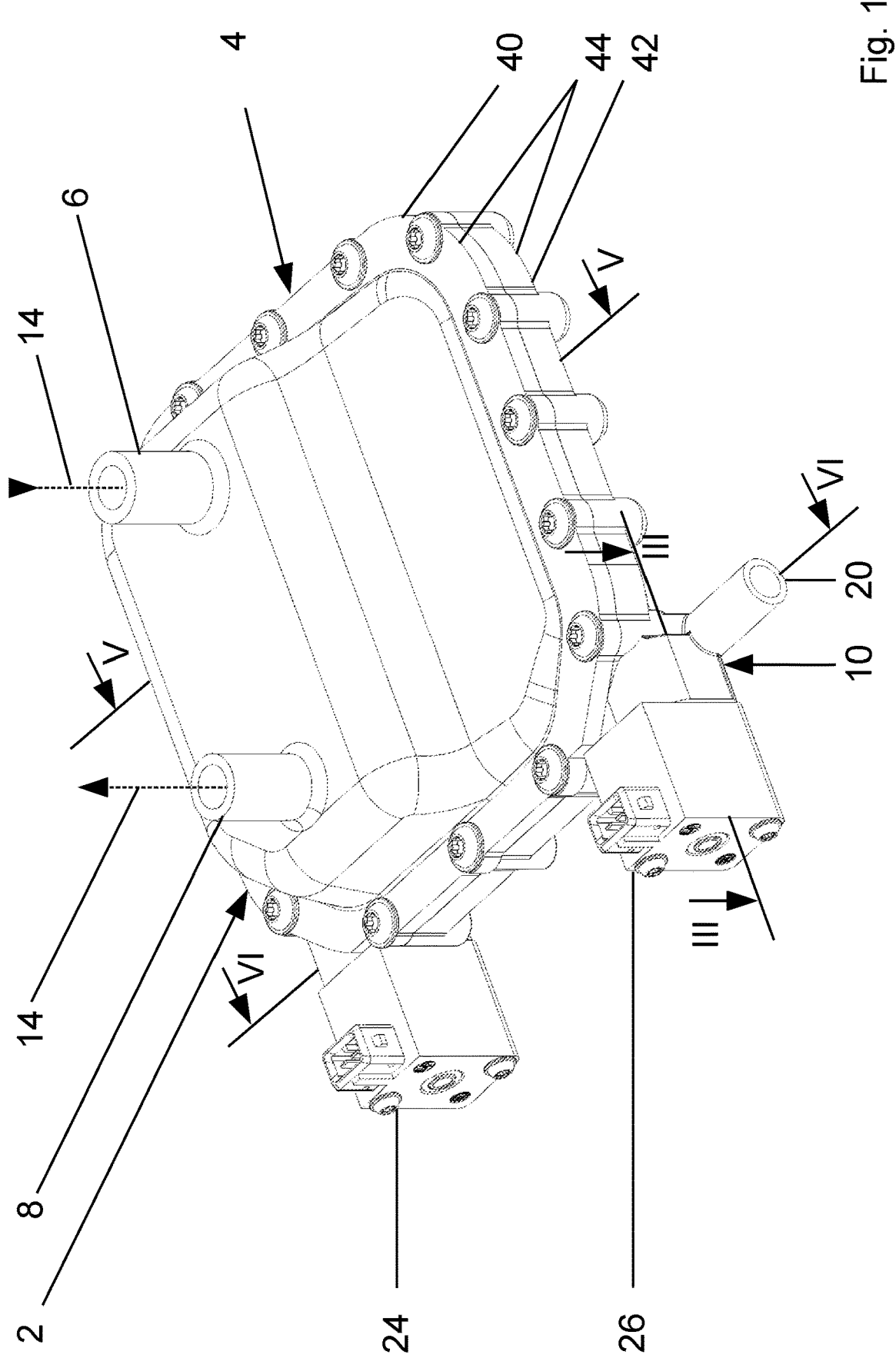
FIG. 1 shows a perspective view of a separator according to the disclosure.

In the figures, identical or mutually corresponding elements are denoted in each case by the same reference signs and will therefore not be described anew unless expedient. In order to avoid repetitions, features that have already been described will not be described again, and such features are applicable to all elements with the same or mutually corresponding reference signs unless this is explicitly ruled out. The disclosures in the description as a whole are transferable analogously to identical parts with the same reference signs or the same component designations. It is also the case that the positional indications used in the description, such as for example above/top, below/bottom, lateral, etc., relate to the figure presently being described and illustrated and, in the case of the position being changed, are to be transferred analogously to the new position. Furthermore, it is also possible for individual features or combinations of features from the different exemplary embodiments shown and described to constitute independent or inventive solutions or solutions according to the disclosure.

Disclosed herein is a separator which, after being started, allows removal of deposits, in particular of liquid deposits, from a housing of the separator.

The separator, in embodiments a water separator, can have a housing with an inlet configured for introduction of a fluid stream into the housing, a first outlet configured for discharge of the fluid stream from the housing, and a second outlet configured for discharge from the housing of deposits which have been separated from the fluid stream. Within the housing, a heat-conducting element is arranged in such a way that the heat-conducting element has one end arranged in or adjacent to the fluid stream and another end arranged on the second outlet. In embodiments, the separator can have a gas line in or on the housing and that is connected fluidically to the second outlet so as to guide a heated gas to the second outlet.

Proposed therefore, according to the disclosure, are two solutions, which solve the mentioned problems both in each case separately and in combination. Both solutions serve for the quickest possible thawing of the frozen water for unblocking the further or second outlet.

On the one hand, the heat-conducting element is used for this purpose. The heat-conducting element may be an element which is separate from the housing, and may consist of a material with high thermal conductivity. The heat-conducting element is, at one end, arranged in or adjacent to the fluid stream. The fluid stream introduced into the housing carries thermal energy. Although the thermal energy acts on the frozen water by convection, it acts only on the surface of the frozen water, which, in some cases, can be situated far away from the second outlet. Without a heat-conducting plate, it would then be the case that firstly only the surface, subjected to heat, of the frozen water is melted, which subsequently acts like an insulator and thereby slows down the melting of the rest of the ice. However, owing to the arrangement of the heat-conducting element, the thermal energy of the fluid stream can also result in heating of the heat-conducting element. By heat conduction, the heat-conducting element can carry the heat from the fluid stream to the second outlet directly and in a targeted manner. This results in a channel being melted free along the heat-conducting element, through which channel the deposits or liquid deposits can be discharged from the housing. Therefore, with the use of the heat-conducting element, for realizing the quickest possible possibility for removal from the housing, it is not necessary to melt all the frozen water up to the second outlet.

For the heating of the heat-conducting element, "adjacent to the fluid path" and "adjacent to the fluid stream" can mean that the heat-conducting element is, at one end, arranged in relation to a fluid path region, surrounding the fluid path of the fluid stream, in such a way that the thermal energy thereof indirectly or directly heats the heat-conducting element. The fluid path region may surround the fluid path of the fluid stream, for example, in the form of an ellipsoid with geometrical foci in the region of the inlet and first outlet.

On the other hand, the gas line is used for this purpose. The gas line may be an element which is separate from the housing or an integral or one-piece element. The gas line may comprise a single inlet and a single outlet and carry a gas. The gas line can at one end, for example via its inlet, be charged with a gas stream. The gas stream (for example nitrogen) can for example be separated out of the fluid stream which is carried through the housing. Since the fluid stream guided through the housing carries thermal energy, the thermal energy is likewise present in the gas stream. The gas stream or another thermal-energy-carrying gas stream can then, in the manner, be carried to the second outlet in order, there, to melt the frozen water.

The inlet in the housing may be an inlet for a fluid stream, for example, comprising recirculation gas (hydrogen/nitrogen-water (droplet) mixture) from a fuel cell. The first outlet may be an outlet for returning the recirculation gas to the fuel cell, in order that the non-recycled hydrogen can be recycled. The second outlet may be a liquid outlet for draining the accumulated water from the housing. The second outlet can be arranged, in relation to a mounting state, in the lowest region of the housing in order, there, for the water to be collected and discharged by gravitational force. The separation in the housing may be realized for example by impact separation, wherein, here, the reduction of the flow speed of the fluid stream to below a specific value is realized.

Beside the above-described advantages, the disclosed separator has the further advantage whereby a cost reduction of an associated fuel cell system can be realized. In particular, the number of required components to be reduced, since the separator is self-heating. Moreover, it is possible to dispense with a fill-level sensor arrangement, which has hitherto been necessary to monitor a critical fill level in the housing.

According to an embodiment of the separator, the heat-conducting element may have a coefficient of thermal conductivity $\lambda$ in the range of 40 W/(m*K) to 400 W/(m*K). An aluminum alloy, for example, has proven to be a particularly advantageous material of the heat-conducting element since, beside suitable conductivity, it is moreover light and simple to process; copper alloys, however, also have these properties. As soon as the heat-conducting element has a temperature of above 0° C., a narrow channel in the direction of the second outlet is melted free. From this moment, correct flushing of the water separator via the second outlet is possible.

According to an embodiment of the separator, the heat-conducting element may be arranged between the first outlet and the second outlet. The heat-conducting element may have an elongate basic shape and extend between the first and second outlets. This leads to a melted-free channel in a direct path between the first and second outlets. Advantageously, the heat element is not arranged at one end in the region of the inlet in order to be heated there. This is because water droplets already deposited could then pass into the recirculation circuit again, wherein the fluid path in the housing may be a part of the recirculation circuit.

According to embodiments of the separator, the heat-conducting element may be of multi-part form or of one-piece form. In additional embodiments, the heat-conducting element can be in the form of a metal sheet or may be formed from a metal sheet. The one-piece form serves for improved conduction of heat through the heat-conducting element.

According to an embodiment of the separator, the heat-conducting element may have at least one stiffening channel, which extends in the direction of the second outlet. The stiffening channel performs two tasks at the same time. It serves, on the one hand, for stiffening the heat-conducting element and, on the other hand, for channeling water, which can run along the channel in the direction of the second outlet. Instead of or in addition to at least one channel, the heat-conducting element may have at least one rib. Moreover, channel and rib additionally serve for surface enlargement of the heat-conducting element, whereby the latter can be heated more quickly.

According to an embodiment of the separator, on its end side facing toward the second outlet, the heat-conducting element may have a heat concentration section, which narrows in the direction of the second outlet. The heat concentration section reduces the width of the heat-conducting element transversely to the direction of heat conduction and leads to the heat-conducting element having a smaller surface at the place where it can be cooled by the ice. The heat carried by the heat-conducting element can then be concentrated to a desired point in order to act there.

According to an embodiment of the separator, on its end side facing toward the second outlet, the heat-conducting element may have a tube section. In additional embodiments, the tube section can be formed materially uniformly with respect to the heat-conducting element. The tube section may adjoin the heat concentration section and perform multiple functions. Firstly, it may feed water to a liquid outlet valve, which the second outlet may comprise. Moreover, a part of a liquid outlet valve may be in abutment in or at the face side of the tube section, whereby this is likewise heated from the outside.

According to an embodiment of the separator, the second outlet may comprise a liquid outlet valve and/or the housing may comprise a third outlet, which comprises a gas outlet valve. The two valves can be arranged on or in the housing. For example, the two valves can be in a cavity of the housing, in such a way that, in a mounting position, the liquid outlet valve is situated at a lower level in order for accumulated water to be guided from the housing with the assistance of gravitational force, and the gas outlet valve is situated at a higher level in order for excess gas, such as for example nitrogen, to be discharged.

According to an embodiment of the separator, the gas line may extend between the third outlet and the second outlet. In additional embodiments, the gas line can open out into a cavity in the second outlet. The liquid outlet valve may be arranged in the cavity. This embodiment leads to it being possible for the hot gas to flow against and defrost the inner side of the liquid outlet valve. The cavity may be formed by the housing. The gas line may also be incipiently cut by one or more cavities and/or be connected to at least one of the cavities via in each case one opening.

According to an embodiment of the separator, the gas line may connect a cavity for the gas outlet valve to a cavity for the liquid outlet valve. At least one of the cavities may be formed by the housing.

According to an embodiment of the separator, the wall of the gas line with respect to the interior space of the housing may at least sectionally have a heat-conducting means. The heat-conducting means may for example be a wall with high thermal conductivity and/or a wall thickness which is thinner than the rest of the wall of the gas line. The heat-conducting means may be heated by the gas in the gas line, wherein the heat can then melt ice which bears against the wall. In this way, it is also possible for ice along the gas line to be melted away and for a further channel in the direction of the second outlet to be melted free.

According to an embodiment of the separator, the separator may comprise an outlet collecting line, which can be formed by the housing. The outlet collecting line may be connected fluidically to the valves and serves for discharge of deposits such as nitrogen and water to the surroundings of the housing. It is conceivable that the outlet collecting line is an extension of the gas line via which that gas which, upstream of the outlet collecting line, has flowed through the cavity for the liquid outlet valve is discharged. It is alternatively or additionally conceivable that the gas line extends parallel to the outlet collecting line and can be connected fluidically thereto. In embodiments, the gas line can be downstream of the cavity for the liquid outlet valve, and the outlet collecting line may lead to the surroundings of the housing from the third outlet via the second outlet.

According to an embodiment of the separator, the housing may be made of a metallic material. Alternatively, the housing may be made of a non-metallic material, for example, a plastic. The housing of the separator may be produced from an insulating material (for example plastic) since there is no need for the heat-conducting effect thereof to thaw the ice. In this way, the heat loss of the recirculation circuit is reduced and the length of time until the optimum operating temperature is shortened, since the separator advantageously uses the waste heat of the fuel cell in a targeted manner. Also in this way, more cost-effective production processes (for example plastic injection molding) and materials (plastic instead of metals) can be used.

According to an embodiment of the separator, the separator may be free of active heating elements which serve for warming the ice. It is therefore possible to dispense with hitherto required active heating elements, for example resistance heaters. This moreover leads to an increase in the efficiency of the fuel cell, since a portion of the generated electrical energy has hitherto been used for the heating and thawing.

According to an embodiment of the separator, the separator may be a water separator for a fuel cell system. The fuel cell system may be a system of a vehicle. Specifically in this application context, the strong points take effect, since it is not necessary to heat fuel cell vehicles in cold surroundings outside of their operation.

Proposed, moreover, is a subassembly comprising a liquid outlet valve and a heat-conducting element according to the above description. The liquid outlet valve and the heat-conducting element may be configured to be arranged in a housing of a separator. The advantages already described above in relation to the separator are obtained analogously for the subassembly too, to which reference is hereby made.

Proposed, moreover, is the use of a heat-conducting element in a liquid separator for transporting the heat from the region of at least the inlet and/or the first outlet to the second outlet, and/or of a gas line which is connected fluidically to the second outlet so as to guide a heated gas to the second outlet. The advantages already described above in relation to the separator are obtained analogously for the use too, to which reference is hereby made.

FIGS. 1 to 7 show different views of an exemplary embodiment of a separator 2. The separator 2 will be described in the context of a fuel cell system. Means for impact separation are not shown for the sake of clarity.

The separator 2 comprises a housing 4 made of plastic that is of two-part design, being composed of a first housing part 40 and a second housing part 42. The housing parts 40, 42 each comprise a peripheral flange 44, via which the two are screwed to one another. In the second housing part 42, a peripheral groove 46 is formed in the flange 44, the peripheral groove accommodating a seal ring 48 which abuts against the flange 44 of the first housing part 40 and via which the housing interior space 50 is sealed off with respect to surroundings.

The first housing part 40 has an inlet 6 which is configured for introduction of a fluid stream 14 into the housing 4. The fluid stream 14 may be part of a recirculation circuit of the fuel cell system. The first housing part 40 moreover has a first outlet 8, which is configured for discharge of the fluid stream 14 from the housing 4. A first outlet opening 28 connects the housing interior space 50 to the first outlet 8. The inlet 6 and the outlet 8 are formed in the same side wall of the first housing part 40 and are oriented parallel to one another. The housing 4 has in the second housing part 42 a second outlet 10, which is configured for discharge from the housing 4 of deposits which have been separated from the fluid stream 14. The second outlet 10 comprises a liquid outlet valve 26, which permits a discharge of liquid from the housing interior space 50. A second outlet opening 30 connects the housing interior space 50 to the second outlet 10. The housing 4 also has in the second housing part 42 a third outlet 16, which is configured for discharge from the housing 4 of gases which have been separated from the fluid stream 14. The third outlet 16 comprises a gas outlet valve 24, which makes possible a discharge of gas from the housing interior space 50. A third outlet opening 32 connects the housing interior space 50 to the third outlet 16. In a mounting position, the inlet 6 and the outlet 8 extend approximately horizontally and the gas outlet valve 24 is arranged above the liquid outlet valve 26.

A gas line 38 extends between the gas outlet valve 24 and the liquid outlet valve 26. The gas line 38 is formed in one piece with the second housing part 42 and connects at least one gas outlet valve cavity 53 formed by the second housing part 42 to at least one liquid outlet valve cavity 54 formed by the second housing part 42. The cavities accommodate the respective valves 24, 26. An outlet collecting line 20 forms an extension of the gas line 38. Gas discharged from the gas outlet valve 24 flows through the gas line 38 in the direction of the liquid outlet valve cavity 54 and enters the latter. The gas subsequently flows into the outlet collecting line 20. Liquid discharged from the liquid outlet valve 26 flows firstly through the liquid outlet valve cavity 54 and then through the outlet collecting line 20, or flows directly into the outlet collecting line 20 without passing through the liquid outlet valve cavity 54. The deposits are discharged via the outlet collecting line 20 to the surroundings.

Figure 2:
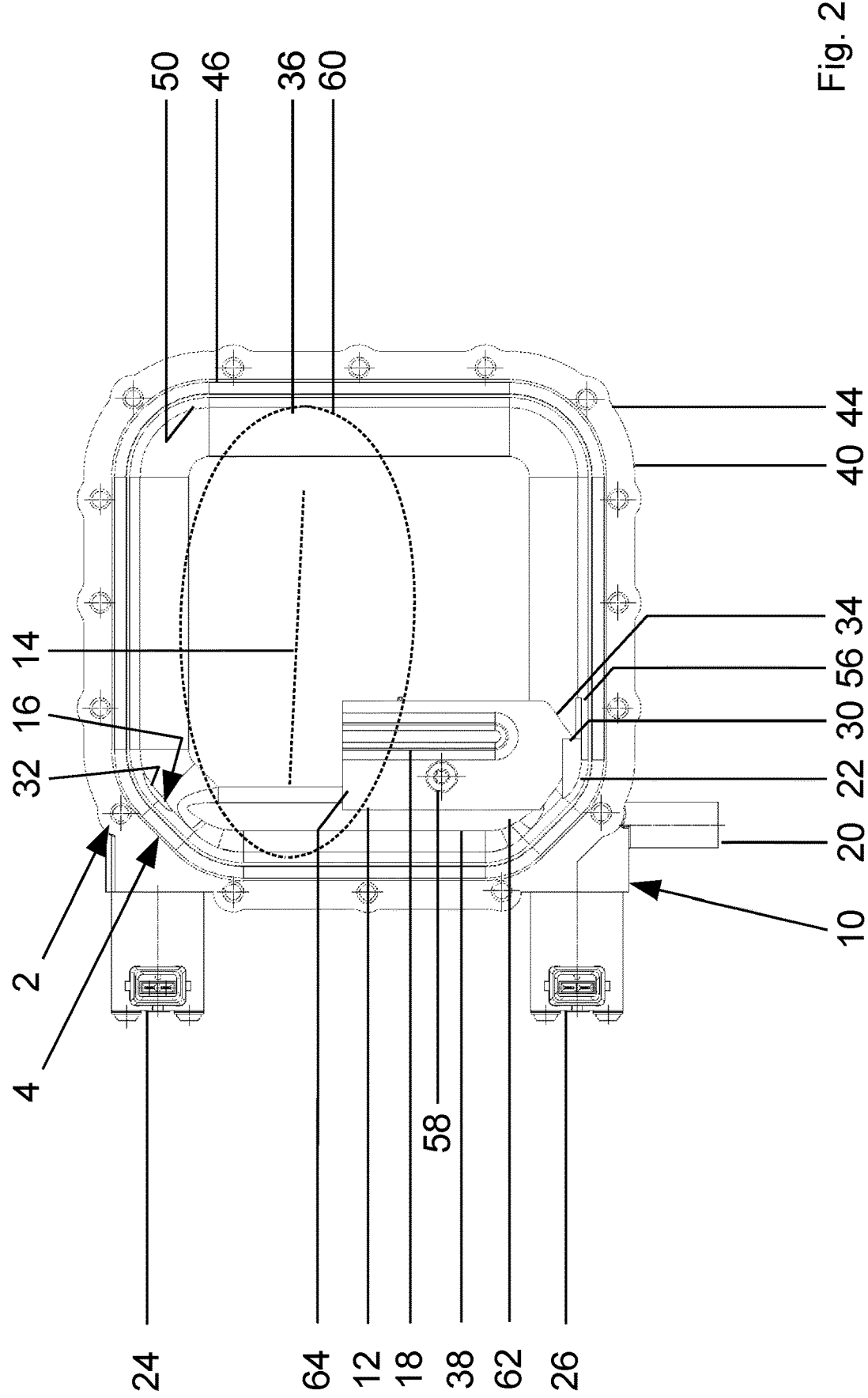
FIG. 2 shows a side view of the separator in FIG. 1.
Figure 3:
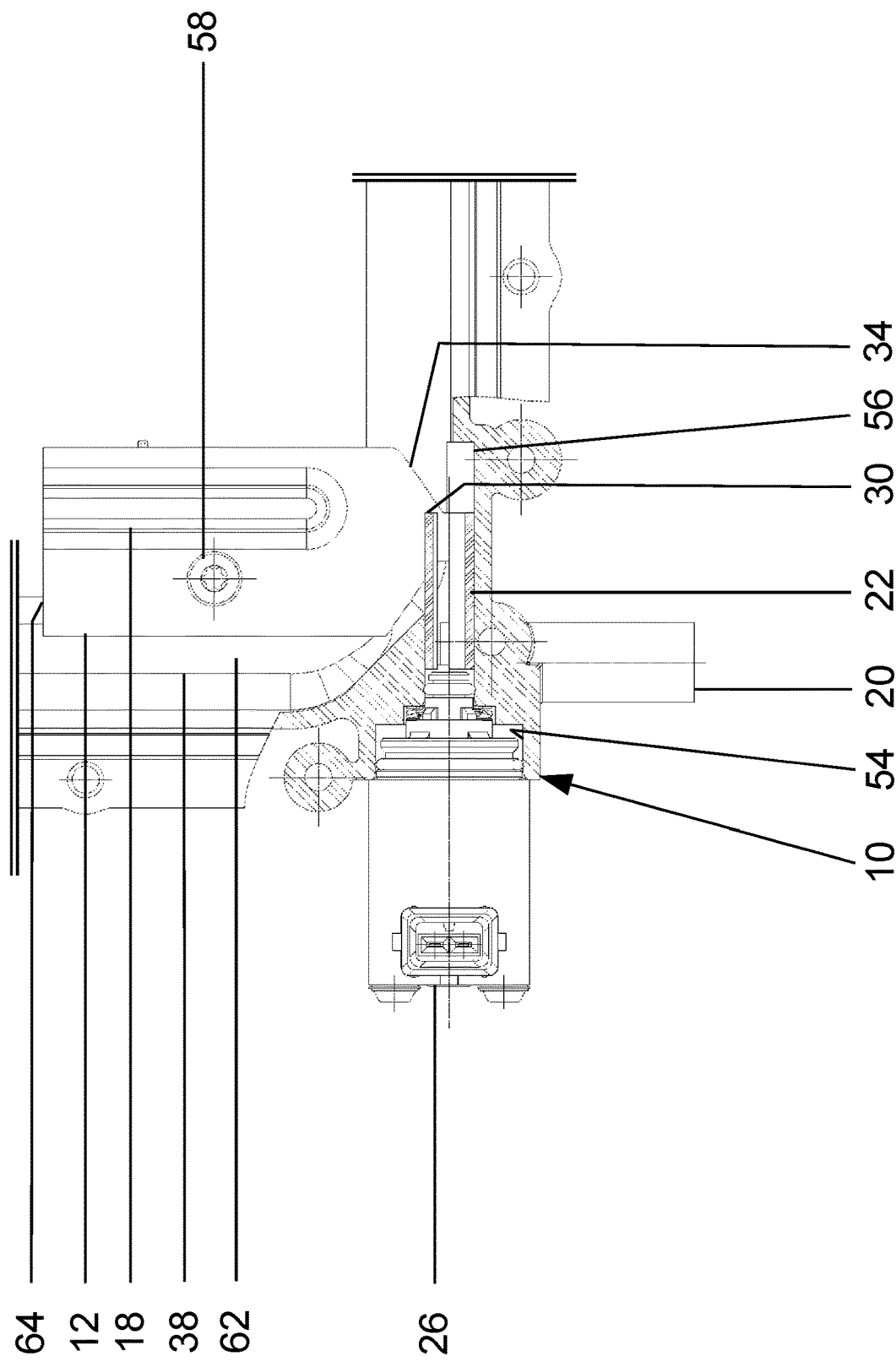
FIG. 3 shows a sectional view taken along sight line III-III in FIG. 1.
Figure 4:
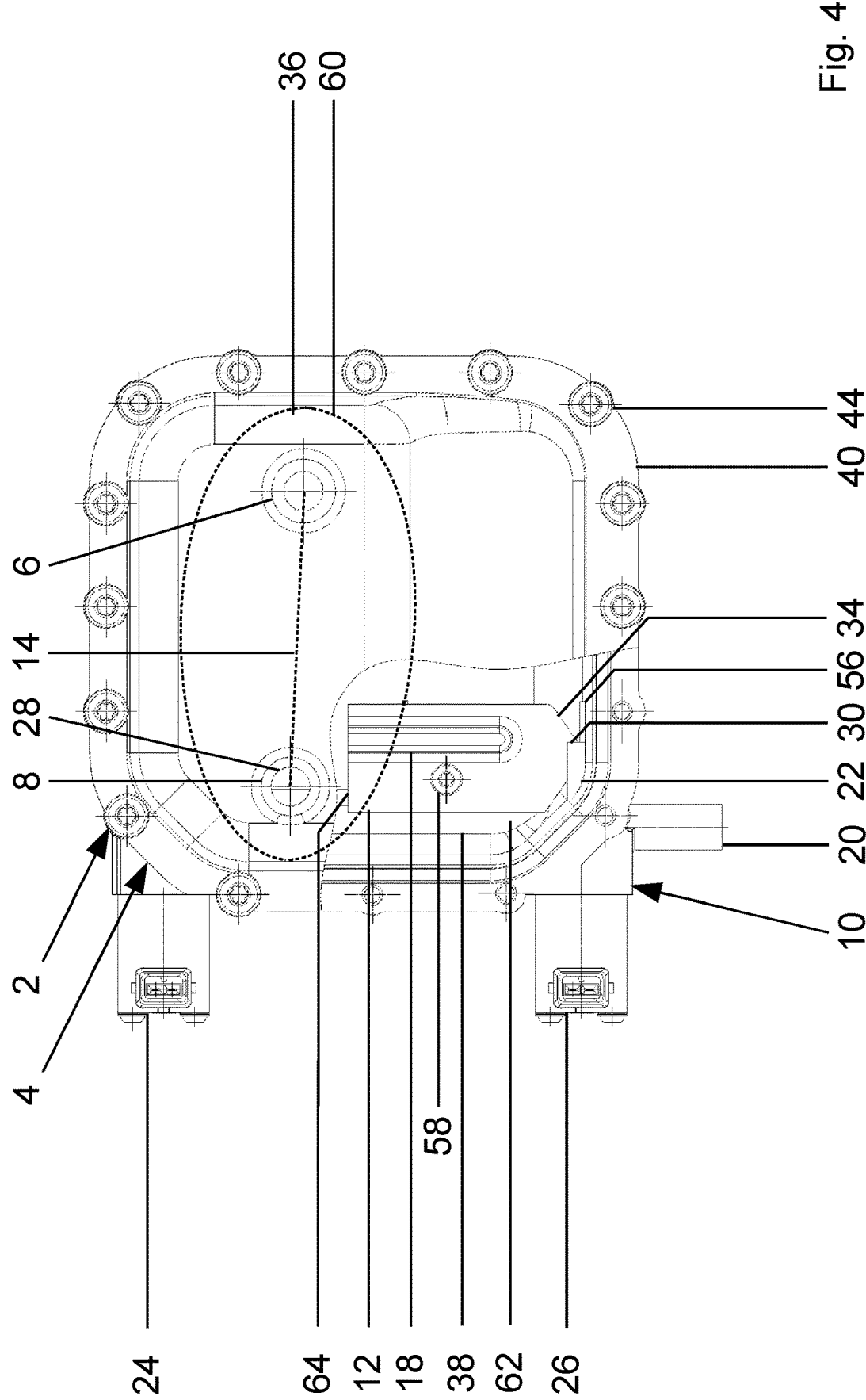
FIG. 4 shows a side view of the separator in FIG. 1 with housing part partially omitted.

FIGS. 2 and 4 show that, within the housing interior space 50, there is arranged a one-piece heat-conducting element 12 which is separate from the housing 4 and which is formed from an elongate metal sheet. The heat-conducting element 12 extends between the first outlet 8 and the second outlet 10. It comprises in its longitudinal direction a stiffening channel 18, which extends in the direction of the second outlet 10. On its side facing toward the second outlet 10, the heat-conducting element 12 comprises a heat concentration section 34. The heat concentration section is in the form of a conical or frustoconical section and reduces the width of the heat-conducting element 12 in the direction of the second outlet 10. At its narrowest point, the heat concentration section 34 is adjoined by a tube section 22, which is formed materially uniformly with respect to the heat-conducting element 12. The tube section 22 may form the second outlet opening 30 and guide water to the liquid outlet valve 26. Half of the diameter of the tube section 22 is accommodated in a cutout 56 of the second housing part 42, whereby the heat-conducting element 12 is fixed. The cutout 56 defines, in a mounting position, the lowest point in the housing interior space 50. Further fixing is realized by a screw connection 58 to the second housing part 42, wherein the screw connection 58 can be insulated thermally in such a way that it separates the heat-conducting element 12 thermally from the second housing part 42 and in this way prevents energy loss in the heat-conducting element 12.

FIG. 4 shows that the fluid path 14 leads into the housing 4 through the inlet 6. From there, it leads to the outlet 8 and then leads out of the housing 4 again. Although the course of the fluid path 14 in the housing 4 is illustrated in linear form, it is contemplated that other alternative courses in the housing 4 can be made depending on the deposit system. The housing-internal fluid path 14 is illustrated in linear form for the sake of clarity. The fluid path 14 forms the center of a fluid path region 36 formed around it, which fluid path region, for the sake of a clearer illustration, has here outer boundaries 60 of a spatial region, although the transitions may be gradual. The fluid path region 36 is that region around the fluid path 14 in which it is possible for there to be realized appreciable heating of the heat-conducting element 12 or the heating region 64 thereof at an end region thereof by convection. In embodiments, the heating region 64 should be situated as close as possible to the fluid path 14, or to the main stream, in order to absorb as much heat as possible, but should be situated far enough away therefrom in order not to generate any excessively disturbing vortices. A hot recirculation gas mixture moves, mainly along the fluid path 14, in the region bounded by the outer boundaries 60. It can be seen that the heat-conducting element 12 is arranged at one end in the fluid path region 36.

The frozen liquid outlet valve 26 can then be defrosted in such a way that a hot recirculation gas mixture is carried into and through the housing 4 along the fluid path 14. In this way, on the one hand, the heat-conducting element 12 is heated at its end region situated in the fluid path region 36, or heating region 64, and, along its extent, melts free a channel in the ice through the housing 4, which channel leads to the liquid outlet valve 26. The heat from the recirculation gas mixture is thus transported in the direction of the liquid outlet valve 26 by the heat-conducting element 12. In this way, on the other hand, hot gas or hot nitrogen is discharged into the gas line 38 from the housing interior space 50 via the gas outlet valve 24 and is carried in a hot state to the liquid outlet valve cavity 54. This embodiment leads to it being possible for the hot gas to flow against and defrost the inner side of the liquid outlet valve 26. The heat-conducting element 12, by contrast, flows against the outer side of the liquid outlet valve 26 in a heating manner and clears the ice there. The wall 62 of the gas line 38 with respect to the interior space 50 of the housing 4 is of such thin form that it is heated by the hot gas within the gas line 38 and melts free another channel in the ice.

Figure 5:
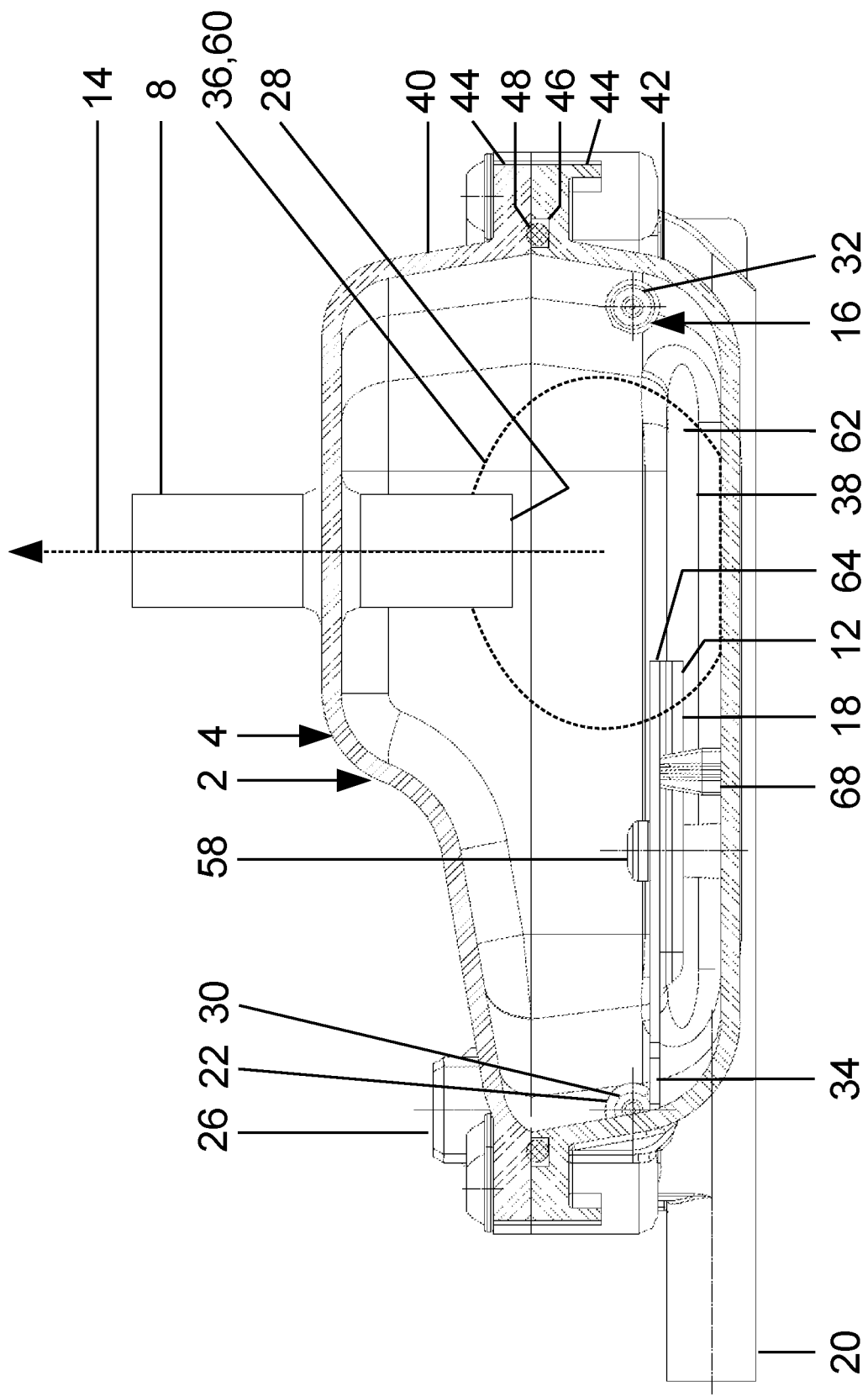
FIG. 5 shows a sectional view taken along sight line V-V in FIG. 1.

FIG. 5 shows a sectional view taken along sight line V-V in FIG. 1, which extends through the housing 4. In particular, there, a spatial arrangement of the heat-conducting element 12 in the housing 4 and the arrangement with respect to the second outlet opening 30 are shown. The housing part 42 has an abutment element 68 which projects from the housing wall. The abutment element 68 may have the shape of a cylinder, which may extend in the direction of the heat-conducting element 12, or may have an arm section, which extends parallel to the heat-conducting element 12 at least sectionally and/or engages below the heat-conducting element 12 in the plane of the drawing. The abutment element 68 abuts against the heat-conducting element 12 via a contact side. The contact side of the abutment element 68 may bear a flexible element, for example an elastomer. It may however also be designed without a flexible element. The abutment element 68 may be designed and/or arranged such that, and/or the heat-conducting metal sheet 12 may be designed and/or arranged such that, the abutment element 68 preloads the heat-conducting metal sheet 12. The abutment element 68 serves as a preload element in order for it not to be possible for the heat-conducting metal sheet 12 to vibrate.

Figure 6:
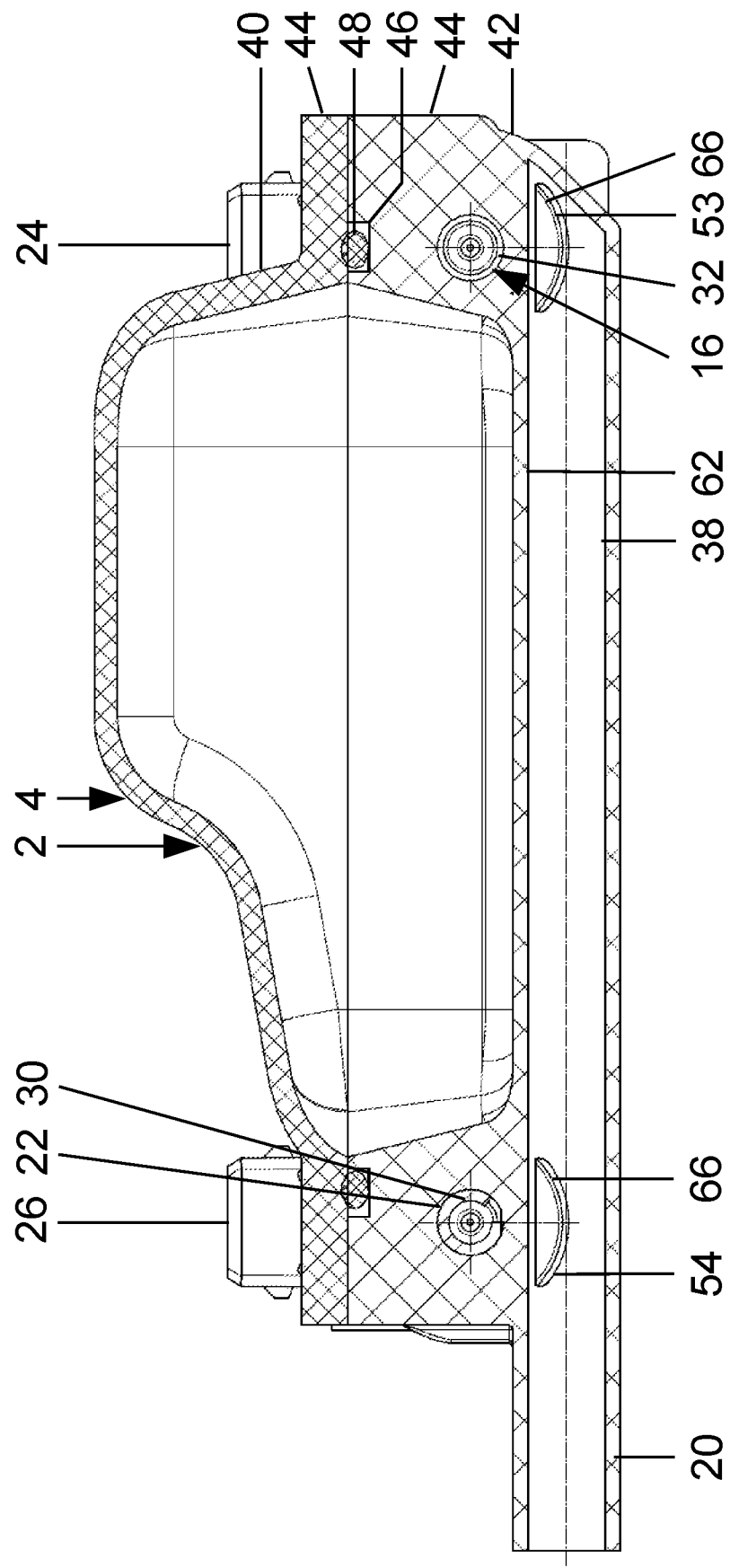
FIG. 6 shows a sectional view taken along sight line VI-VI in FIG. 1.

FIG. 6 shows a sectional view taken along sight line VI-VI in FIG. 1, wherein the sectional view extends parallel to the sectional view taken along sight line V-V in FIG. 1. In FIG. 6, however, the separator 2 is sectioned along the outlet collecting line 20 and gas line 38. It can be seen in particular that the gas line 38 opens out into the outlet collecting line 20. The two may form a common line. The gas line 38 has on its circumference two openings 66, which may have a semicircular cross section. Each opening 66 is assigned to a cavity 53, 54. The gas outlet valve cavity 53 is connected fluidically to the gas line 38 via the opening 66 which is on the right-hand side in the plane of the drawing, and the liquid outlet valve cavity 54 is connected fluidically to the gas line 38 via the opening 66 which is on the left-hand side in the plane of the drawing. The openings 66 may be in the form of incipient cuts.

Figure 7:
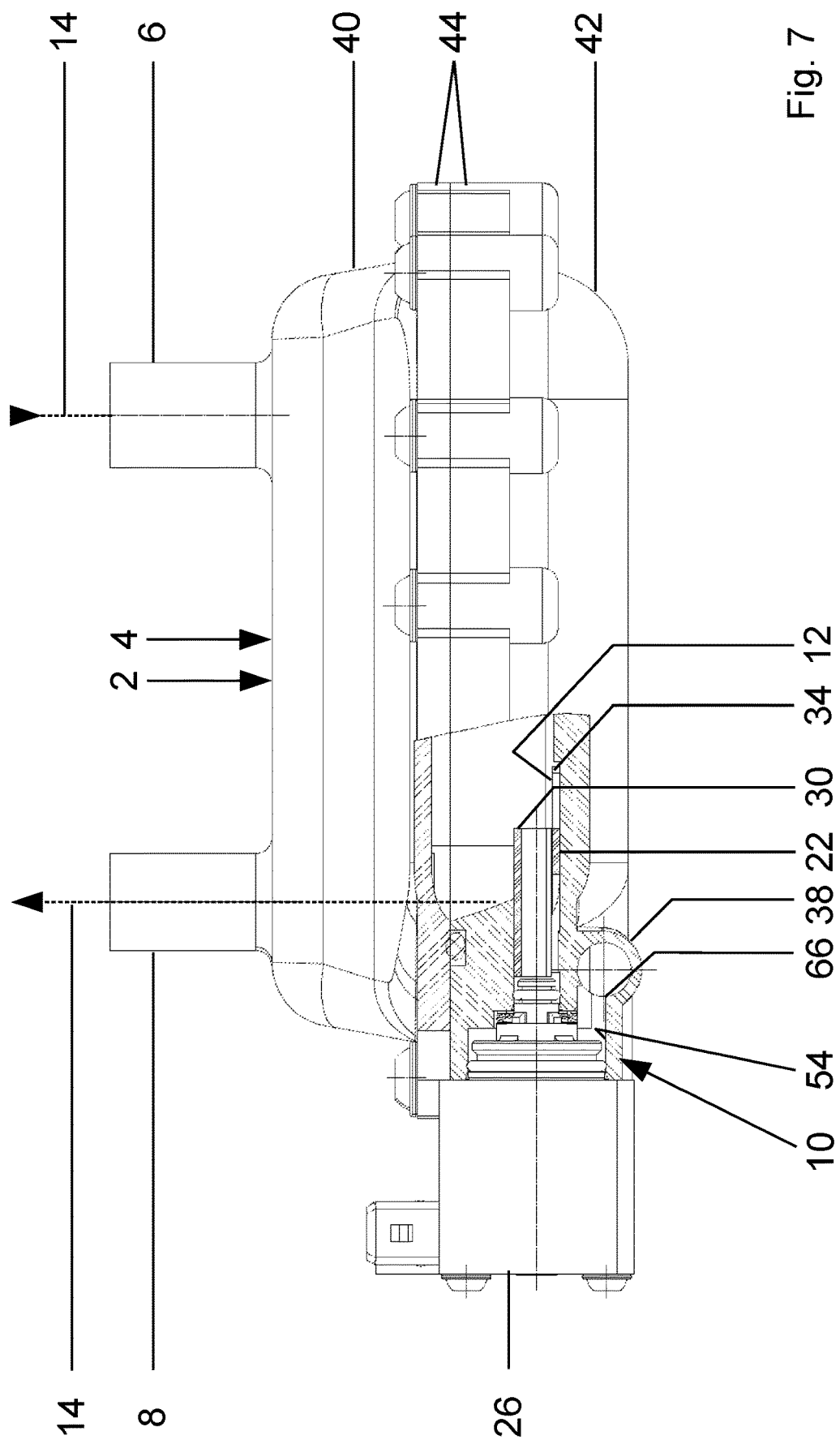
FIG. 7 shows a bottom view of the separator in FIG. 1 with housing part partially omitted.

FIG. 7 then shows a bottom view of the separator in FIG. 1 with housing 4 partially omitted in the region of the liquid outlet valve 26. The liquid outlet valve 26 is partially inserted into the housing part 42 and received in the liquid outlet valve cavity 54. At the face side of the liquid outlet valve 26, the tube section 22 projects into the housing 4. It can moreover be seen that the liquid outlet valve cavity 54 is connected to the gas line 38 via the opening 66. This view also makes clear the incipient cut of the gas line 38 that leads to the opening 66. The incipient cut may be formed for example by drilling. Although not shown in FIG. 7, these features also apply analogously to the gas outlet valve 24 and the connection thereof to the gas line 38.

To avoid repetitions, it is the intention that features disclosed in device terms are also disclosed, and capable of being claimed, in method terms. It is likewise the intention that features disclosed in method terms are disclosed, and capable of being claimed, in terms of the device.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, methods and steps described in the specification. As one of ordinary skill in the art will readily appreciate from the disclosure, processes, machines, manufacture, compositions of matter, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, methods, or steps.

LIST OF REFERENCE NUMERALS

2 Separator
4 Housing
6 Inlet
8 First outlet
10 Second outlet
12 Heat-conducting element
14 Fluid stream
16 Third outlet
18 Stiffening channel
20 Outlet collecting line
22 Tube section
24 Gas outlet valve
26 Liquid outlet valve
28 First outlet opening
30 Second outlet opening
32 Third outlet opening
34 Heat concentration section
36 Fluid path region
38 Gas line
40 Housing part
42 Housing part
44 Flange
46 Groove
48 Seal ring
50 Housing interior space
53 Gas outlet valve cavity
54 Liquid outlet valve cavity
56 Cutout
58 Screw connection
60 Outer boundary
62 Wall
64 Heating region
66 Opening
68 Abutment element

What is claimed is:

1. A separator comprising:
 a housing having an inlet configured for introduction of a fluid stream into the housing, a first outlet configured for discharge of the fluid stream from the housing, and a second outlet configured for discharge from the housing of deposits which have been separated from the fluid stream;
 a heat-conducting element in the housing, wherein an end of the heat-conducting element is arranged in or adjacent to the fluid stream, wherein another end of the heat-conducting element is arranged on the second outlet; and
 a gas line in or on the housing, wherein the gas line is connected fluidically to the second outlet and configured to guide a heated gas to the second outlet.

2. The separator according to claim 1, wherein the heat-conducting element is arranged between the first outlet and the second outlet.

3. The separator according to claim 1, wherein the heat-conducting element has at least one stiffening channel extending in a direction of the second outlet.

4. The separator according to claim 1, wherein the heat-conducting element has an end side facing toward the second outlet.

5. The separator according to claim 4, wherein the heat-conducting element has a heat concentration section which narrows in a direction of the second outlet.

6. The separator according to claim 4, wherein, on the end side facing toward the second outlet, the heat-conducting element has a tube section.

7. The separator according to claim 6, wherein the tube section is formed materially uniformly with respect to the heat-conducting element.

8. The separator according to claim 1, wherein the second outlet comprises a liquid outlet valve.

9. The separator according to claim 1, wherein the housing comprises a third outlet.

10. The separator according to claim 9, wherein the third outlet comprises a gas outlet valve.

11. The separator according to claim 9, wherein the gas line extends between the third outlet and the second outlet.

12. The separator according to claim 11, wherein the gas line opens out into a cavity in the second outlet.

13. The separator according to claim 1, wherein the housing is made of a metallic material.

14. The separator according to claim 1, wherein the housing is made of a non-metallic material.

15. A method for heating a second outlet of a separator, wherein the separator has a housing having an inlet configured for introduction of a fluid stream into the housing, a first outlet configured for discharge of the fluid stream from the housing, and a second outlet configured for discharge from the housing of deposits which have been separated from the fluid stream, the method comprising:

transporting, by a heat-conducting element, heat from a region of the inlet, of the first outlet, or of both the inlet and the first outlet to the second outlet.

16. The method according to claim 15, further comprising:

guiding, via a gas line which is connected fluidically to the second outlet, heated gas to the second outlet.

17. A separator comprising:

a housing having an inlet configured for introduction of a fluid stream into the housing, a first outlet configured for discharge of the fluid stream from the housing, and a second outlet configured for discharge from the housing of deposits which have been separated from the fluid stream; and a heat-conducting element in the housing, wherein an end of the heat-conducting element is arranged in or adjacent to the fluid stream, wherein another end of the heat-conducting element is arranged on the second outlet.

18. The separator according to claim 17, wherein the heat-conducting element is arranged between the first outlet and the second outlet.

19. The separator according to claim 17, wherein the heat-conducting element has at least one stiffening channel extending in a direction of the second outlet.

20. The separator according to claim 17, wherein the heat-conducting element has an end side facing toward the second outlet.

\* \* \* \* \*